US012793449B2

(12) United States Patent
Sahlmann et al.

(10) Patent No.: US 12,793,449 B2
(45) Date of Patent: Nov. 10, 2026

(54) COMPUTER-BASED DETERMINATION OF FLAVIVIRUS INFECTIVITY

(71) Applicant: Takeda Vaccines, Inc., Cambridge, MA (US)

(72) Inventors: Kerstin Sahlmann, Singen (DE); Carina Seitz, Singen (DE); Marco Stillhard, Glattpark-Opfikon (CH)

(73) Assignee: Takeda Vaccines, Inc., Cambridge, MA (US)

( * ) Notice: Subject to any disclaimer, the term of this patent is extended or adjusted under 35 U.S.C. 154(b) by 176 days.

(21) Appl. No.: 18/862,410

(22) PCT Filed: May 3, 2023

(86) PCT No.: PCT/US2023/020840
§ 371 (c)(1),
(2) Date: Nov. 1, 2024

(87) PCT Pub. No.: WO2023/215383
PCT Pub. Date: Nov. 9, 2023

(65) Prior Publication Data

US 2025/0342705 A1 Nov. 6, 2025

Related U.S. Application Data

(60) Provisional application No. 63/338,150, filed on May 4, 2022.

(30) Foreign Application Priority Data

Jul. 1, 2022 (EP) .................................... 22182622

(51) Int. Cl.
*G06V 20/69* (2022.01)
*G06V 10/25* (2022.01)
(Continued)

(52) U.S. Cl.
CPC ............ *G06V 20/698* (2022.01); *G06V 10/25* (2022.01); *G06V 10/82* (2022.01); *G06V 20/693* (2022.01); *G06V 20/70* (2022.01); *G06V 2201/03* (2022.01)

(58) Field of Classification Search
CPC .... G06V 20/70; G06V 2201/03; G06V 10/82; G06V 20/693; G06V 20/698; G06V 10/25
(Continued)

(56) References Cited

U.S. PATENT DOCUMENTS

| | | | | |
|---|---|---|---|---|
| 6,122,396 | A * | 9/2000 | King | C12M 41/48 382/128 |
| 7,060,436 | B2 * | 6/2006 | Lyamichev | C12Q 1/703 435/174 |

(Continued)

FOREIGN PATENT DOCUMENTS

| | | | |
|---|---|---|---|
| WO | 199837911 | A1 | 9/1998 |
| WO | 2001060847 | A2 | 8/2001 |

(Continued)

OTHER PUBLICATIONS

Vardan Andriasyan, Artur Yakimovich, Anthony Petkidis, Fanny Georgi, Robert Witte, Daniel Puntener, Urs F. Greber, "Microscopy deep learning predicts virus infections and reveals mechanics of lytic-infected cells", iScience, vol. 24, Issue 6, 2021, https://doi.org/10.1016/j.isci.2021.102543. (Year: 2021).*

(Continued)

*Primary Examiner* — Justin W Rider
(74) *Attorney, Agent, or Firm* — Honigman LLP

(57) ABSTRACT

A computer-implemented method of determining infectivity of a flavivirus-containing sample is described. The method includes receiving (S1), with a computing device (10), image data indicative of an image of at least a part of a container (50, 50*a*, 50*b*) comprising a composition contain-
(Continued)

ing host cells with one or more foci (51) generated by infecting the host cells with the flavivirus over an incubation period and optionally subsequent staining of the incubated host cells. The method further includes determining (S2) a number of foci (51) in the at least part of the container (50, 50*a*, 50*b*) based on processing the received image data with at least one trained deep learning algorithm of the computing device (10), wherein the number of foci (51) is indicative of the infectivity of the flavivirus in the sample.

20 Claims, 3 Drawing Sheets

(51) Int. Cl.
*G06V 10/82* (2022.01)
*G06V 20/70* (2022.01)

(58) Field of Classification Search
USPC .......................................................... 382/133
See application file for complete search history.

(56) References Cited

U.S. PATENT DOCUMENTS

| | | | | |
|---|---|---|---|---|
| 9,709,565 | B2* | 7/2017 | Eden | C12Q 1/6883 |
| 9,938,331 | B2* | 4/2018 | Schellenberger | C07K 14/56 |
| 10,373,702 | B2* | 8/2019 | Zhang | G16B 15/20 |
| 10,857,222 | B2* | 12/2020 | Noriega | A61K 39/295 |
| 2008/0091471 | A1* | 4/2008 | Michon | G16B 40/20 705/3 |
| 2014/0270457 | A1* | 9/2014 | Bhargava | G06V 20/69 382/133 |
| 2015/0339585 | A1* | 11/2015 | Ding | G16Z 99/00 706/12 |
| 2017/0039314 | A1* | 2/2017 | Bremel | G16B 20/20 |
| 2017/0298119 | A1* | 10/2017 | Wollacott | A61K 39/12 |
| 2018/0285520 | A1* | 10/2018 | Butruille | A01H 1/04 |
| 2020/0199555 | A1* | 6/2020 | Zhang | C12N 15/907 |
| 2021/0017255 | A1* | 1/2021 | Liu | A61K 39/12 |
| 2021/0045375 | A1* | 2/2021 | Taylor | A01M 1/026 |
| 2022/0042085 | A1* | 2/2022 | Liu | C12Q 1/6806 |

FOREIGN PATENT DOCUMENTS

| | | | | |
|---|---|---|---|---|
| WO | 2003101397 | A2 | 12/2003 | |
| WO | 2007021672 | A2 | 2/2007 | |
| WO | WO-2007109105 | A2 * | 9/2007 | A61P 31/14 |
| WO | 2008007021 | A1 | 1/2008 | |
| WO | 2008047023 | A2 | 4/2008 | |
| WO | 2008065315 | A1 | 6/2008 | |
| WO | 2014150939 | A2 | 9/2014 | |
| WO | 2017179017 | A1 | 10/2017 | |
| WO | WO-2019140334 | A1 * | 7/2019 | G01N 33/54393 |

OTHER PUBLICATIONS

Anne F. Payne, Iwona Binduga-Gajewska, Elizabeth B. Kauffman, Laura D. Kramer, "Quantitation of flaviviruses by fluorescent focus assay", Journal of Virological Methods, vol. 134, Issues 1-2, 2006, pp. 183-189, https://doi.org/10.1016/j.jviromet.2006.01.003. (Year: 2006).*

International Search Report issued in PCT/US2023/020840 on Sep. 11, 2023.

Written Opinion issued in PCT/US2023/020840 on Sep. 11, 2023.

Dodkins, Rupert et al. "A Rapid, High Throughput, Viral Infectivity Assay using Automated Brightfield Microscopy with Machine Learning." bioRxiv (2022): n. pag.

Payne, Anne F. et al. "Quantitation of flaviviruses by fluorescent focus assay." Journal of virological methods 134 1-2 (2006): 183-9.

Tadesse, Loza F. et al. "Toward rapid infectious disease diagnosis with advances in surface-enhanced Raman spectroscopy." The Journal of chemical physics 152 24 (2020): 240902.

* cited by examiner

COMPUTER-BASED DETERMINATION OF FLAVIVIRUS INFECTIVITY

CROSS REFERENCE TO RELATED APPLICATIONS

This application is a National Phase application filed under 35 USC § 371 of International Application No. PCT/US2023/020840, filed May 3, 2023, which claims the benefit of, and priority to, U.S. Provisional Application No. 63/338,150, filed May 4, 2022 and European Patent Application No. 22 182 622.5 filed Jul. 1, 2022, the disclosures of which are incorporated by reference herein in their entireties.

TECHNICAL FIELD

The present disclosure generally relates to the determination of virus infectivity or virus potency of a sample containing flavivirus. In particular, the present disclosure relates to a computer-implemented method of determining infectivity of a flavivirus-containing sample based on image processing. Further, the present disclosure relates to a computing device configured to carry out steps of the method, to a corresponding computer program, and to a non-transitory computer-readable medium storing such program. Moreover, the present disclosure relates to use of the aforementioned method and/or device in quality control of vaccines or vaccine production, for example dengue vaccines.

TECHNICAL BACKGROUND

Vaccines for protection against viral infections have been effectively used to reduce the incidence of human disease. One of the most successful technologies for viral vaccines is to immunize animals or humans with a weakened or attenuated virus strain (a "live attenuated virus"). The limited viral replication is sufficient to express the full repertoire of viral antigens and can generate potent and long-lasting immune responses to the virus. Thus, upon subsequent exposure to a pathogenic virus strain, the immunized individual is protected from the disease. These live attenuated viral vaccines are among the most successful vaccines used in public health.

A virus family currently under increased investigation for vaccines is the family Flaviviridae. The family Flaviviridae includes three genera, flavivirus, hepacivirus and pestivirus. The genus flavivirus contains highly pathogenic and potentially hemorrhagic fever viruses, such as yellow fever virus and dengue virus, encephalitic viruses, such as Japanese encephalitis virus, Murray Valley encephalitis virus, West Nile virus, Zika virus and a number of less pathogenic viruses.

An exemplary flavivirus-induced disease is dengue fever or dengue disease. Dengue disease is a mosquito-borne disease caused by infection with a dengue virus. Dengue virus infections can lead to debilitating and painful symptoms, including a sudden high fever, headaches, joint and muscle pain, nausea, vomiting and skin rashes. To date, four serotypes of dengue virus have been identified as being particularly susceptible to humans: dengue-1 (DENV-1), dengue-2 (DENV-2), dengue-3 (DENV-3) and dengue-4 (DENV-4). However, other serotypes of dengue virus are known, such as DENV-5, which may be particularly susceptible to monkeys. It is noted that the present disclosure is not limited to any of the aforementioned serotypes of dengue virus, but may be applied or used to advantage for other serotypes of dengue virus or any flavivirus.

Dengue virus serotypes 1-4 can also cause dengue hemorrhagic fever (DHF) and dengue shock syndrome (DSS). In the most severe cases, DHF and DSS can be life threatening. Dengue viruses cause 50-100 million cases of debilitating dengue fever, 500,000 cases of DHF/DSS, and more than 20,000 deaths each year, a large portion of which are children. All four dengue virus serotypes susceptible to humans are endemic throughout the tropical and/or subtropical regions of the world and constitute the most significant mosquito-borne viral threat to humans there. Dengue viruses are transmitted to humans primarily by *Aedes aegypti* mosquitoes, but also by *Aedes albopictus* mosquitoes. Infection with one dengue virus serotype results in life-long protection from re-infection by that serotype, but does not prevent secondary infection by one of the other three dengue virus serotypes. In fact, previous infection with one dengue virus serotype may lead to an increased risk of severe disease (DHF/DSS) upon secondary infection with a different serotype.

Takeda has developed a tetravalent dengue vaccine candidate (TAK-003). The tetravalent dengue virus composition is a dengue virus composition comprising four different immunogenic components from the four different dengue serotypes DENV-1, DENV-2, DENV-3 and DENV-4, comprising four different live, attenuated dengue viruses, each representing one dengue serotype, and which aims to stimulate immune responses to all four dengue serotypes.

For quality control and reliable manufacture of vaccines, including live attenuated viruses, it is of interest and importance to determine the infectivity, activity and/or potency of the virus, which is usually indicated by the titer of the corresponding virus. For multivalent viruses, such as dengue, also a determination of the titer of the individual attenuated viruses, for example in the monovalent Bulk Drug Substance (BDS), and tetravalent vaccine drug product (DP) may be of interest. The determination of the virus titer can also be used as an in process control test (IPC) during manufacture of vaccines.

A commonly used assay to determine the titer of a virus and to control vaccine quality is the determination of virus potency, infectivity and/or activity by performing an Immunofocus Assay (IFA). The principle of the IFA is based on classical vertebrate virus plaque assays where serial dilutions of virus are adsorbed on monolayers of adherent cells from a suitable host. After a period of time to allow infectious virions to bind and be taken up by cells, an overlay medium containing gelling agents is added to prevent diffusion of virions. Therefore, progeny virions can only infect cells adjacent to the original infected cell. This results in a roughly circular focus of infection for each infectious unit of virus.

The IFA can differ from the classical plaque assay in that foci of infection are detected by immunostaining instead of visual observation of the cytopathic effect (CPE). After an incubation period to allow viral replication, cells are typically fixed and stained using virus-specific primary antibodies and a labeled secondary antibody.

In a typical workflow for quality control in vaccine production, serotype-specific primary antibodies, an enzyme-linked secondary antibody and a chromogenic substrate can be used in order to visualize the foci. Foci visualized in the IFA are then counted manually and the virus activity is calculated based on the manually counted foci. This conventional approach or procedure, however, can be time-consuming, error-prone and subject to interpersonal variations in counting. Also, ensuring data integrity or maintaining a high level of data integrity can be challenging when manually counting the foci.

SUMMARY

It may, therefore, be desirable to provide for an improved method and device for focus quantification and/or focus counting.

This is achieved by the subject matter of the independent claims, wherein further embodiments are incorporated in the dependent claims and the following description.

Aspects of the present disclosure relate to a computer-implemented method of determining infectivity of a flavivirus-containing sample, to a computing device configured to carry out such method, to a computer program, to a computer-readable medium, and to the use of the method and/or computing device for quality control, in particular in vaccine production. Any disclosure presented hereinabove and hereinbelow with respect to one aspect of the present disclosure, equally applies to any other aspect of the present disclosure.

According to an aspect of the present disclosure, there is provided a computer-implemented method of determining infectivity of a flavivirus-containing sample. Alternatively or additionally, the method according to the present disclosure may relate to a computer-implemented method of determining, quantifying and/or assessing at least one of an activity, a potency and/or a titer of a flavivirus-containing sample. Alternatively or additionally, the method according to the present disclosure may relate to a computer-implemented method of determining a number of foci in a container. Therein, one or more steps of the method, in particular all steps of the method, can be carried out by means of a computing device. It is noted, though, that this does not exclude manual steps, for example related to preparation of the container. Accordingly, the method described herein may refer to a computer-implemented, a computer-assisted and/or a computer-based method. The method comprises the following steps:

- receiving, with a computing device, image data indicative of an image of at least a part of a container comprising a composition containing host cells with one or more foci generated by infecting the host cells with the flavivirus over an incubation period and optionally subsequent staining of the incubated host cells; and
- determining, evaluating, and/or assessing a number of foci in the at least part of the container based on processing and/or analyzing the received image data with at least one trained deep learning algorithm of the computing device, wherein the number of foci is indicative of the infectivity of the flavivirus in the sample.

The inventors of the present invention found that the image data of a container generated in an immunofocus assay using one or more deep learning (DL) algorithms for counting the foci can allow for an accurate, efficient, fast, objective and reliable determination of the number of foci in the container, in particular when compared to conventional manual counting of foci as currently used. Also, it has been found that no commercially available software could reliably be used for foci counting, in contrast to the approach based on a DL algorithm, as described herein. Specifically, the computer-implemented approach of foci counting described herein allows for a much faster determination of the number of foci in the at least part of the container, which is less error-prone and not subject to interpersonal variations in counting, as can be the case in manual counting or with other known software-assisted approaches. As a consequence, virus activity, potency, infectivity and/or titer may be determined with high accuracy and precision based on the computer-implemented method described herein. Also, data integrity may be significantly improved using the computer-implemented approach of determining infectivity of a flavivirus-containing sample, as described herein. Further, the method disclosed herein may be of particular advantage for quality control in the production or manufacturing of vaccines.

Generally, a number of foci generated per unit area or unit volume of the container can correlate with and/or can be indicative of an activity, an infectivity, a potency and/or a titer of the virus. Hence, by determining the number of foci in the at least part of the container, any one or more of the virus activity, the viral titer, the virus infectivity and the virus potency can be determined. It is noted that activity, infectivity, potency, and titer of the virus may be interchangeably used herein.

In the context of the present disclosure, determining the number of foci in the container is to be construed broadly. In particular, determining the number of foci can include determining one or more measures or quantities correlating with and/or being indicative of an actual number of foci in the at least part of the container. For instance, a density of foci, such as an areal density and/or a volumetric density, or one or more other measures may be determined or computed in order to determine the number of foci in the at least part of the container. Further, the number of foci in the at least part of the container may be given on an arbitrary scale as relative or absolute values, as confidence level, as confidence interval, as probability, as class indicator or any other appropriate measure or quantity.

As used herein, the term "live, attenuated dengue virus" refers to a viable and infectious dengue virus which is mutated to provide reduced virulence. The live, attenuated dengue virus can be a dengue virus in which all components are derived from the same dengue serotype or it can be a chimeric dengue virus having parts from two or more dengue serotypes. A "virus strain" and in particular a "dengue virus strain" is a genetic subtype of a virus, in particular of a dengue virus, which is characterized by a specific nucleic acid sequence. A dengue serotype may comprise different strains with different nucleic acid sequences which have the same cell surface antigens and are therefore recognized by the same antibodies. A dengue virus strain can be a dengue virus in which all components are derived from the same dengue serotype or it can be a chimeric dengue virus having parts from two or more dengue serotypes.

As used herein, the computing device may refer to and/or include a processing circuitry with one or more processors for data processing. It is emphasized that any reference to a singular computing device hereinabove and hereinbelow can include a plurality of computing devices, such as a server network or cloud computing system. In other words, the computing device according to the present disclosure can refer to a computing network or computing system including a plurality of inter-operating and/or communicatively coupled devices. For receiving and/or transmitting data, the computing device may optionally include one or more communication interfaces, such as one or more wireless or wired communication interfaces.

Further, the at least one trained deep learning (DL) algorithm (also referred to as DL algorithm, first DL algorithm and/or second DL algorithm) may refer to and/or denote software instructions, for example a computer program, which when executed by the computing device, for example by one or more processors of the computing device, instruct the computing device to carry out steps of the method as described hereinabove and hereinbelow.

The at least one DL algorithm can be pre-trained on the computing device or on another computing device. Moreover, the at least one trained DL algorithm can be implemented by means of software and/or hardware, such as for example in an application specific integrated circuit.

The image data of the at least one image of the at least part of the container can refer to the data of one or more images of the at least part of the container acquired and/or captured with one or more image sensors of one or more cameras.

Generally, the image data may be at least two-dimensional image data. For example, the image data may refer to two-dimensional image data including a plurality of data points in a data matrix or two-dimensional grid, wherein each data point is associated with two-dimensional spatial coordinates, one or more color values and/or one or more intensity values. Alternatively or in addition, three-dimensional or multi-dimensional image data, such as for example depth sensor data, point cloud data or the like, may be used to determine the number of foci in the at least part of the container.

Further, the image data may be associated with an image of a part or portion of the container. Alternatively, image data of one or more images of the entire container may be processed. The latter may further increase a quality and precision in the detection of the number of foci. Alternatively or additionally, a plurality of containers may be captured in one or more images and the image data of these one or more images may be used to determine the number of foci.

As used herein, the container may refer to a tank, vessel, well, vial or compartment of arbitrary geometry, shape, and/or volume, which is suitable and/or configured for performing an IFA to generate the composition of host cells with the one or more foci induced by infecting the host cells with the flavivirus over the incubation period and optionally subsequent staining of the incubated host cells.

In particular, the container may refer to or include a well of a (standard) multi-well assay plate, preferably a 6-well plate, 12-well plate or 24-well plate. Such configuration may allow to determine the number of foci in a plurality of wells (sequentially or simultaneously) based on analyzing the image data of one or more images of the plurality of wells. In turn, precision, quality, efficiency, and speed in the detection and/or the counting of the foci can be further improved and/or increased.

According to an embodiment, receiving the image data includes retrieving the image data from one or more data sources, for example from one or more data storages of the computing device or any other data source. In other words, the computing device may comprise at least one data storage, and the computing device may be configured to retrieve the image data from the data storage of the computing device. Alternatively or additionally, the computing device may be configured to retrieve and/or receive the image data from an external data source communicatively coupled to the computing device, such as an external data source of a further computing device. Alternatively or additionally, the image data may be retrieved from one or more cameras.

Further, the image data may refer to raw image data, for example raw sensor data captured with one or more image sensors. Alternatively, the image data may refer to pre-processed data. For example, raw sensor data may be processed by the computing device or another device to generate the image data. Such processing or pre-processing may include, for instance, one or more of blur correction, noise reduction, color correction, conversion of color data into binary or grayscale data, or any other image manipulation or processing operation, as also described in more detail hereinbelow.

According to an embodiment, determining the number of foci comprises evaluating the image data with respect to one or both of a predefined maximum number of foci allowed in a single container and a predefined minimum number of foci allowed in a single container. As used herein, the predefined number of foci allowed in a single container can refer to a predefined threshold value for the maximum or minimum number of foci per container (or per given container volume or area). It is noted that the “maximum/minimum number of foci allowed” may be synonymously used herein with “maximum/minimum number of foci allowed in a single container” and/or with “maximum/minimum number of foci allowed per container”.

Generally, foci of different size, shape, appearance and/or intensity may be detectable in the image data and/or may be visible in the one or more images associated with the image data. In containers with a local or overall high density of foci, an accurate determination of the number of foci may be increasingly challenging for an increasing number of foci per area or volume of the container, as foci may overlap and may hardly be discernible from one another. Accordingly, by defining the maximum number of foci allowed in a single container and by evaluating the image data with respect thereto, it may be ensured that the number of foci can be accurately determined with high precision. On the other hand, a number of foci below the predefined minimum number allowed may for example indicate an erroneous IFA and the number of foci in such container may not accurately reflect virus activity. Excluding such containers may thus further increase accuracy and precision of the determined number of foci as well as the titer computer based thereon.

According to an embodiment, evaluating the image data with respect to one or both the predefined maximum number of foci allowed and the predefined minimum number of foci allowed in a single container includes counting the foci and comparing the number of foci to the predefined maximum number and/or to the minimum number. Accordingly, the computing device may be configured to determine the number of foci using the at least one DL algorithm and compare the determined number of foci to the predefined maximum and/or minimum number of foci allowed. Alternatively or additionally, the at least one DL algorithm may be specifically trained to identify containers having a number of foci above or below the predefined maximum and/or minimum number of foci allowed. In particular, the at least one DL algorithm may be specifically trained to identify containers having a number of foci between the predefined minimum number allowed and the predefined maximum number allowed.

According to an embodiment, the image data is evaluated with respect to one or both the predefined maximum number of foci allowed and the predefined minimum number allowed based on detecting the one or more foci in the at least part of the container using a first trained deep learning algorithm of the computing device, wherein the number of foci in the at least part of the container is determined based on detecting the one or more foci in the at least part of the container using a second trained deep learning algorithm different than the first trained deep learning algorithm. In other words, the computing device may include at least two different DL algorithms, which are utilized to evaluate the image data to determine the number of foci in the container and/or to determine one or more of viral titer, virus activity, infectivity, and potency of the virus.

Therein, the image data may be evaluated simultaneously by the first and second DL algorithm, or the image data may be evaluated sequentially by the first and second DL algorithm. The first trained DL algorithm may be specifically configured to evaluate the image data with respect to the predefined maximum and/or minimum number of foci allowed. Such specifically trained DL algorithm can allow to reliably and efficiently identify containers having a number of foci between the minimum and maximum number of foci allowed, which are also referred to as valid containers herein. By training two different DL algorithms for two distinct tasks or operations, such as the detection of containers with a number of foci within a predefined range given by the minimum and maximum numbers of foci allowed, and the actual counting of the foci in the container, efficiency, reliability and accuracy of the determination of the number of foci can be further improved.

As mentioned above, the image data may be evaluated and/or processed sequentially or simultaneously by the first DL algorithm and the second DL algorithm. In the sequential approach, the first DL algorithm may evaluate the image data related to one or more containers with respect to the predefined maximum and/or minimum number of foci allowed per container, and optionally may flag and/or mark one or more containers having a number of foci below and/or equal to the minimum number of foci allowed per container. Alternatively or additionally, the first DL algorithm may flag and/or mark containers with a number of foci equal to and/or above the maximum number of foci allowed per container. Subsequent to the evaluation of a container by the first DL algorithm and upon determining by the first DL algorithm that the number of foci in said container is below the maximum number and/or above the minimum number foci allowed, the second DL algorithm may evaluate the image data related to said container to count and/or determine the actual number of foci in said container. Generally, such sequential or consecutive evaluation of the image data by the first and second DL algorithms may increase an overall speed of the determination of the virus activity, because only containers (or corresponding image data) having a number of foci below the minimum number and/or above the maximum number of foci allowed may be evaluated by the second DL algorithm.

In the simultaneous approach, image data related to one or more containers may be evaluated simultaneously by the first and second DL algorithm. This may mean that the first and second DL algorithms can run in parallel for at least a certain period of time to evaluate the image data associated with the one or more containers. In an example, image data related to a container may be analyzed and/or evaluated by the first DL algorithm with respect to the predefined maximum and/or minimum number of foci allowed per container, and the second DL algorithm may simultaneously evaluate the image data related to said container to count and/or determine the actual number of foci in said container. Optionally, a result or output of the first DL algorithm may be compared to a result or output of the second DL algorithm to determine whether the results of the first and second DL algorithms are consistent or match each other. In other words, the results or outputs of the first and second DL algorithms may be checked for consistency. In case of inconsistent results or outputs of the first and second DL algorithms, the result of the first DL algorithm may overrule the result of the second DL algorithm. Accordingly, an output or result of first DL algorithm may be associated with a higher weight or importance compared to an output or result of the second DL algorithm. For instance, the first DL algorithm may determine a number of foci in a single container above the predefined maximum number, whereas the second DL algorithm may indicate a number of foci below the predefined maximum number of foci. Such containers may be flagged invalid based on the result of the first DL algorithm. It should be noted, though, that alternatively the result or output of the second DL algorithm may overrule the result or output of the first DL algorithm.

According to an embodiment, the first trained deep learning algorithm and the second trained deep learning algorithm differ in one or more of a type of the respective deep learning algorithm, and a training applied to the respective deep learning algorithm. In particular, the first and second DL algorithm may be trained to accomplish different tasks or operations in the process of foci counting, which may involve training the respective algorithm with different training data.

By way of example, training data used to train the first DL algorithm may include images or image data of a plurality of containers, which can optionally be labelled or annotated, with a number of foci exceeding the predefined number of foci allowed, as well as images or image data of a plurality of containers where the number of foci is below the predefined maximum number allowed and/or below (or above) the predefined minimum number allowed. For training the second DL algorithm, primarily training data or images of containers with a number foci below the predefined maximum number and/or above the predefined minimum number of foci allowed may be used, although image data where this condition is not fulfilled may also be used for training the second DL algorithm.

The trainings of the first and second algorithm may optionally differ in one or more further aspects related to the training, such as a duration of the training, an annotation of the training data, a labelling of the training data, a definition of the ground truth or any other aspect.

According to an embodiment, the first trained deep learning algorithm is trained to identify containers containing a number of foci exceeding the predefined maximum number of foci allowed and/or containers containing a number below the predefined minimum number allowed. Alternatively or additionally, the second trained deep learning algorithm is trained to determine the number of foci in the at least part of the container. In other words, the first DL algorithm may be specifically configured to detect containers having a number of foci between the minimum and maximum number of foci allowed, e.g. in a single container. This may mean that the first DL algorithm can be configured to determine whether or not a given container has more foci than the maximum number allowed and/or less foci than the minimum number allowed. Accordingly, an output or result of the first DL algorithm may be a binary value or binary result indicative of whether the number of foci in the container is in a valid range of foci per container, which valid range may be defined by the minimum number of foci allowed in a single container and the maximum number of foci allowed in a single container.

Alternatively or additionally, the first DL algorithm may be configured to classify a container indicated or represented by the image data into two classes, one class indicating that the number of foci in the container exceeds the maximum number allowed and/or is below the predefined minimum number of foci allowed, and a further class indicating that the number of foci in the container is in a range between the predefined minimum and maximum number.

Alternatively or additionally, the second DL algorithm may be specifically configured to count the foci in the container and/or to determine the number of foci in the container. Accordingly, a result or output of the second DL algorithm may be indicative of the actual number of foci present in the container and/or a corresponding likelihood. For instance, the second DL algorithm may be configured to classify a given container according to the number of foci detected in the image data of the container into a plurality of classes, each class representing a particular number or range of foci in the container, for example a number between zero and 100. The class with the highest probability may be considered as the output or result of the second DL algorithm, and the number or range of foci associated with said class may be used to compute the virus activity, potency, infectivity and/or titer.

In an embodiment, the second DL algorithm is configured to determine the number of foci in the container and/or to count the foci in the container based on the result of the evaluation of the image data with the first DL algorithm.

According to an embodiment, the method further comprises determining, with the first trained deep learning algorithm, whether the number of foci detected in the at least part of container exceeds the predefined maximum number of foci allowed and/or is below the predefined minimum number of foci allowed in a single container. The method may further comprise marking and/or flagging the container as invalid upon determining that the number of foci detected in the at least part of the container exceeds the predefined maximum number of foci allowed and/or is below the predefined minimum number of foci allowed in a single container. Accordingly, the first DL algorithm may be configured to filter-out or remove containers having a foci number exceeding the maximum number of foci allowed and/or having a number of foci below the predefined minimum number of foci allowed in a single container. Alternatively or additionally, the first DL algorithm may be configured to select, chose and/or identify containers having a foci number between the predefined maximum and minimum number.

According to an embodiment, the predefined maximum number of foci allowed per container ranges from about 70 to about 200, preferably from about 80 to about 150, and may more preferably be about 100 foci per container. Alternatively or additionally, the predefined minimum number of foci allowed may range from 0 to about 30, preferably from 0 to about 20, and may more preferably be about 10 foci per container.

The inventors surprisingly found that such values for the maximum number of foci on the one hand allow for an accurate, reproducible, and reliable detection of containers below this threshold value, and on the other hand, allow for a subsequent accurate, reproducible, and reliable counting of the foci and/or determination of the actual number of foci. It is noted that the above numbers may particularly refer to a standard container with an area of between about 9.2 $cm^2$ to about 10.0 $cm^2$, for example on average about 9.6 $cm^2$. For larger containers, correspondingly larger maximum numbers of foci allowed may be chosen.

Alternatively or in addition to evaluating one or more containers in terms of the predefined maximum number of foci allowed in a single container, one or more predefined threshold values for a maximum density or average maximum density of foci per area of the container may be utilized. For example, a predefined threshold value for the spatial density of foci allowed may range from about 2 foci/$cm^2$ to about 20 foci/$cm^2$, for example about 5 foci/$cm^2$ to about 15 foci/$cm^2$, in particular about 7 foci/$cm^2$ to about 12 foci/$cm^2$, preferably about 10 foci/$cm^2$. It should be noted that one or more containers may be evaluated and an average density of foci may be determined, which may then be compared to one or more predefined threshold values for the density of foci allowed. Alternatively or in addition to a predefined minimum number of foci allowed, a minimum density of foci allowed may be considered.

According to an embodiment, at least one of the first trained deep learning algorithm and the second trained deep learning algorithm is implemented as convolutional neural network in the computing device. In particular, both the first and second DL algorithm may be implemented as convolutional neural network. Neural networks may be particularly suited for object detection based on image processing with high accuracy and within a short period of time.

According to an embodiment, the first trained deep learning algorithm is a region-based algorithm for object detection. Alternatively or additionally, the second DL algorithm may be configured to determine the number of foci based on object detection applying a regression or classification approach.

According to an embodiment, the first trained deep learning algorithm is a Faster region-based convolutional neural network, Faster R-CNN, algorithm. Alternatively or additionally, the second trained deep learning algorithm is a "You Only Look Once", YOLO, algorithm.

In the following, general aspects of deep learning, object detection and the first and second DL algorithms are summarized. Generally, deep learning can allow for computational models that are composed of multiple processing layers to learn representations of data with multiple levels of abstraction. The image data, for example, may come in the form of an array of pixel values, and the learned features in the first layer of representation may represent the presence or absence of edges at orientations and locations in the image. The second layer may detect motifs by spotting arrangements of edges, regardless of small variations in the edge positions and so on. The main aspect of DL may be that these hidden layers of features may not be programmed by humans, but they are learned by the algorithm itself. Object detection based on DL aims at locating and classifying existing objects in any image or image data, and labeling them with bounding boxes to show the confidence of existence. The frameworks of object detection methods can mainly be categorized into two types: One generates first a region proposal and then classifies each proposal into different object categories. An example of such algorithm is Faster region-based CNN (Faster R-CNN)). The other regards object detection as a classification or regression problem and can therefore perform both tasks simultaneously. An example of such algorithm being "You Only Look Once" (YOLO).

YOLO can train on full images and directly optimize detection performance, which can increase overall performance significantly. Since YOLO sees the entire image during training and test time, it can encode contextual information about classes as well as their appearance.

As described hereinabove and hereinbelow, in an exemplary embodiment, algorithms of both object detection categories may be used to determine the number of foci in a container. In particular, Faster R-CNN may be used as first DL algorithm to recognize wells or containers that contain more than the predefined maximum number allowed and/or below the predefined minimum number allowed. YOLO may be used as second DL algorithm and may be trained to count and/or quantify foci in a container. This approach may allow for a fast and efficient determination of viral titer, since containers with an excessive number of foci can be filtered out by the first DL algorithm and only containers (or corresponding image data) with a foci number below the maximum number and/or above the minimum number may be analysed by the second DL algorithm, which may safe overall computational efforts.

According to an embodiment, one or more of image processing, blob detection and a support vector machine may be utilized to detect and count the foci in a container. Therein, image processing may include executing one or more image processing operations on the image data or on raw-sensor data, from which the image data may be derived.

In the following, non-limiting examples of image processing operations are described, which may generally allow to get an enhanced image or to extract useful information from it, such as information related to location, size, and appearance of one or more foci or other information useful for foci counting. For example, one or more images can be acquired and the corresponding image data may be received by the computing device and transformed in one or more image processing operations into grayscale. Optionally, one or more of smoothening, noise reduction, blur correction, thresholding, binarization and segmentation may be applied in the alternative or in addition.

In a grayscale image or corresponding image data, the value of each pixel may represent only the amount of light and carries only intensity information. For an 8-bit grayscale image the amount of possible pixels would be 2*8=255 pixel (including 0). Image binarization may be considered as thresholding method by reducing the pixel value only to two values. A fixed value may be defined and every pixel of the grayscale image below may turn black and every pixel above may turn white, or vice versa.

Alternatively or additionally, Gaussian smoothening may be applied as noise and detail reduction operations, which may allow to enhance the wanted information and to suppress the unwanted information, preferably without altering relevant features beyond recognition. In binary images, dilation may preferably be used to reduce noise. In dilation, a layer of pixels may be added to the inner and outer boundaries of regions, resulting in an expending of shapes in the input image.

Alternatively or additionally, segmentation of a digital image or image data may be applied, which may involve dividing the image or image data into a number of disjoint regions, so that pixels of every region have similar visual characteristics. For instance, the watershed algorithm may be applied to grayscale or binary images or corresponding image data. Therein, a grayscale image may symbolize a topographic relief flooded with water, where watersheds may be lines dividing areas of water from different basins. In a binary image, distance transformation may be used, wherein the distance from every pixel to the nearest non-zero-valued pixel may be computed.

One or more of the aforementioned image processing operations may be used to extract needed information for foci counting. Also, one or more of these image processing operations may be combined with each other or with other techniques or algorithms described herein.

In an embodiment, blob detection may be applied for foci counting, which may allow to detect different properties in an image or image data like shape and area. Therein, a blob may refer to a region which is consistent with the defined settings and can be separated from others in the image that do not fit.

In an embodiment, supervised machine learning may be applied, which may allow the computing device to learn and be trained in accordance with specific constraints or a desired outcome. Based on the desired outcome of the algorithm, machine learning algorithms can be organized in supervised and unsupervised learning groups. During supervised learning, the process can be divided into two steps: training and testing. The training data may contain correct object labels to train the algorithm, and the resulting classifier may then be used to predict labels for any new data. Both Support Vector Machines (SVMs) and DL may be considered a subcategory or part of the supervised machine learning.

Generally, SVMs are supervised machine learning models that can be used for classification objectives solving two-class classification problems. For example, one class may represent the foci and a further class may represent everything that is not a focus. SVMs can be based on finding a hyperplane in an N-dimensional space (N=number of features) that distinctly classifies the data points of the image data. Therein, the hyperplane that creates the maximum distance between the data points of both classes may be determined. Further, support vectors may refer to data points that are the closest to the hyperplane and influence the position and orientation of it. The support vectors can contain a tuning parameter in order to control the misclassification it will allow. In order to find the best suited hyperplane, the SVM can perform feature extraction. Features that can be extracted are for example important parameters like shape, lightness or saturation of an image or image data. As with all supervised learning, there is a bias-variance tradeoff. When the tuning parameter is small, the classifier may allow only a small bit of misclassification. The support vectors will have low bias but may not generalize well and have high variance. If the tuning parameter is large, the number of misclassifications allowed may have been increased. Such classifier may generalize better but may have a high amount of bias. The optimal solution may be to find a classifier with low misclassifications and a good generalization. The biggest advantage of using an SVM may be the huge generalization capability compared to few data points (support vectors) needed and little computing power required.

In an exemplary embodiment, a combination of the at least one DL algorithm with one or more of image processing, blob detection and support vector machine is utilized to determine the number of foci in a container.

According to an embodiment, the container comprises a cell monolayer with immunostained viral antigens of the flavivirus sample resulting in optically detectable foci. Alternatively or additionally, determining the number of foci includes optically identifying one or more foci in the image based on processing the image data with the computing device.

According to an embodiment, the method further comprises:

determining, based on processing the image data with the computing device, a cell-free portion of the container, the cell-free portion lacking cells of the cell culture; and marking the container as invalid upon determining that determined cell-free portion of the container exceeds a predefined threshold or threshold value for a maximum cell-free portion allowed in a single container.

Accordingly, the image data may be evaluated in terms of a cell free portion of the container, which may refer to a fraction of the container's area, where no cells are present, and only containers having a cell free portion below the predefined threshold for the maximum cell-free portion in a single container may be utilized to count the number of foci. Generally, containers having an excessive cell-free portion may indicate an erroneous IFA performed on the container, and the corresponding number of foci in such container may not reliably represent the viral infectivity.

According to an embodiment, the predefined threshold for the maximum cell-free portion allowed is about 5% to about 20%, preferably about 8% to about 15%, for example about 10% of a usable area of the container.

According to an embodiment, the method further comprises determining the titer of the flavivirus-containing sample based on the determined number of foci in the at least part of the container.

The titer, potency, activity and/or infectivity of the flavivirus may be computed per volume of sample material, for example a vaccine, which may also referred to as volume dose given in ml dose. For instance, the virus titer per 1.0 ml dose, per 0.5 ml dose or per other dose volumes may be computed. Further, the titer, potency, activity and/or infectivity of the flavivirus may be given as Plaque Forming Units, PFUs, per ml dose.

According to an embodiment, the number of foci is determined for a plurality of containers based on analysing a plurality of image data, each associated with one of the plurality of containers, and the titer, potency, activity and/or infectivity of the flavivirus is computed based on the numbers of foci determined for the plurality of containers.

An exemplary formula for the computation of the titer, potency, activity and/or infectivity of the flavivirus based on a plurality of containers i, . . . , n and corresponding foci counts or numbers $F_i$ is given below:

$$\text{Virus titer}\left[\frac{PFU}{\text{ml}}\right] = \frac{\sum_{i=1}^{n} F_i * (\text{dilution factor})}{(\text{Volume of virus per container}) * n}$$

Optionally, the sample virus titer can be transformed into the logarithmic value by the base 10. Further optionally, only containers i which satisfy one or more conditions may be considered for determining the titer using above formula. In particular, only containers with a number of foci below the predefined maximum number allowed in a single container may be used to compute the titer. Alternatively or additionally, a threshold value for a minimum number of foci allowed in a single container, the cell-free portion of a container, or other threshold values may be applied to select a set of containers satisfying these conditions and to finally compute the virus titer based on the individual numbers of foci determined for each container of the selected set of containers.

Exemplary formulae for monovalent and tetravalent virus (for a plate with one or more containers or wells), taking into account wells or containers with a number of foci between 10 and 100 are provided below:

Monovalent Virus:

$$\text{Titer per plate}\left[\frac{FFU}{\text{ml}}\right] = \frac{\sum_{wells\ with\ 10\ to\ 100\ foci} (\text{Focus count} \times \text{Dilution factor})}{\frac{0.5\text{ ml}}{\text{well}} \times (\text{number of wells with } 10-100\ foci)}$$

Tetravalent Virus:

$$\text{Titer per plate}\left[\frac{FFU}{\text{ml}}\right] = \frac{\sum_{wells\ with\ 10\ to\ 100\ foci} (\text{Focus count} \times \text{Dilution factor})}{\frac{0.5\text{ ml}}{\text{well}} \times (\text{number of wells with } 10-100\ foci)} \times 0.5\text{ ml dose}$$

The flavivirus-containing sample can be a monovalent vaccine. In another example embodiment the flavivirus-containing sample can be a monovalent sample tested during and/or after manufacturing of a monovalent drug substance and/or drug product, i.e. the method of the present invention can be used as a quality control procedure during and/or after one or more manufacturing steps. Thus, in one embodiment, the method can be used to test an intermediate product generated during the production of a vaccine.

In one preferred embodiment, the flavivirus is a Zika virus. In another preferred embodiment, the flavivirus is a dengue virus.

Thus, in one preferred embodiment, the flavivirus-containing sample comprises at least one live-attenuated dengue strain, such as e.g. a chimeric dengue strain. In one embodiment, the flavivirus-containing sample comprises at least two different live-attenuated dengue strains, such as e.g. chimeric dengue strains. In one embodiment, the flavivirus-containing sample comprises at least three different live-attenuated dengue strains, such as e.g. chimeric dengue strains. In one embodiment, the flavivirus-containing sample comprises at least four different live attenuated dengue strains, such as e.g. four different live attenuated strains, for example four different live attenuated dengue strains with each strain being e.g. either a chimeric and/or non-chimeric dengue strain, such as e.g. comprising:

(i) live attenuated chimeric dengue virus serotype 1, and
(ii) live attenuated non-chimeric dengue virus serotype 2, and
(iii) live attenuated chimeric dengue virus serotype 3, and
(iv) live attenuated chimeric dengue virus serotype 4;

in particular such as the live-attenuated vaccine candidate "TAK-003".

A "chimeric virus" or "chimeric strain" or "chimeric virus strain" in general comprises parts from at least two different viruses. For example, a chimeric virus can comprise the prM and E proteins of dengue virus and the other proteins from another flavivirus. The chimeric virus can comprise the prM and E proteins of dengue virus and the other proteins from another flavivirus such as yellow fever virus, Zika virus, West Nile virus, Japanese encephalitis virus, St. Louis encephalitis virus and tick-borne encephalitis virus. The chimeric virus can comprise the prM and E proteins of dengue virus and the other proteins from yellow fever virus strain YF-17D. Such chimeric viruses are present in the commercial product Dengvaxia® and are described in, e.g., WO 98/37911, WO 03/101397, WO 2007/021672, WO 2008/007021, WO 2008/047023 and WO 2008/065315.

A "chimeric dengue virus" or "chimeric dengue serotype strain" or "chimeric dengue strain" as describes herein preferably comprises parts from at least two different dengue serotypes, i.e. a dengue-dengue chimera. Such chimeric dengue viruses are described in WO 01/060847 A2, WO 2014/150939 A2 and WO 2017/179017 A1. A chimeric dengue virus may include parts from a different flavivirus such as yellow fever virus, Zika virus, West Nile virus, Japanese encephalitis virus, St. Louis encephalitis virus and tick-borne encephalitis virus. For example, the chimeric dengue virus can include parts from the yellow fever virus.

According to an embodiment, the flavivirus-containing sample comprises a virus selected from the group consisting of dengue virus, yellow fever virus, Zika virus, an encephalitic virus, Japanese encephalitis virus, Murray Valley encephalitis virus, and West Nile virus, such as, e.g., dengue viruses or Zika virus. Preferably, the flavivirus is selected from one or more of dengue virus serotype 1, dengue virus serotype 2, dengue virus serotype 3 and dengue virus serotype 4.

According to an embodiment, the flavivirus-containing sample is a vaccine comprising a monovalent or multivalent attenuated virus composition, in particular a tetravalent dengue virus composition.

According to an embodiment, the container is a well of a multi-well assay plate, preferably a 6-well plate, 12-well plate or a 24-well plate. It is emphasized that the present disclosure is not limited to these types of containers.

According to an embodiment, receiving the image data comprises acquiring and/or capturing one or more images of the at least part of the container using at least one camera operatively coupled to the computing device. The one or more captured images may be stored on a data storage and retrieved therefrom by the computing device. Alternatively or additionally, the at least one camera may be configured to transmit the image data to the computing device, for example via wireless or wired connection.

In an example, a plurality of images of a single container may be captured from different view angles by one or more cameras, and the images from different view angles may be combined to generate the image data.

According to an embodiment, the method further comprises:

(a) seeding cells from a dengue-susceptible cell line in an assay plate and culturing the cells for a culture period;
(b) preparing serial dilutions of the dengue virus-containing sample;
(c) adding the serially diluted samples to the cells seeded and cultured in step (a) and incubating the cells over a first incubation period;
(d) providing an overlay medium for the cells incubated in step (c), and incubating the cells with the overlay medium over a second incubation period;
(e) fixing of the incubated cells;
(f1) immunostaining of the incubated cells using a dengue virus serotype specific antibody as first antibody and a second antibody being specific for the first antibody and conjugated to an enzyme capable of converting a substrate to a visible dye or conjugated to a detectable label; or
(f2) immunostaining of the incubated cells using a dengue virus serotype specific antibody as first antibody conjugated to a detectable label; and
(g) determining the titer of each dengue virus serotype by counting the number of foci in each well of the assay plate using the computing device.

One or more of the aforementioned steps may relate to preparation of the container to capture one or more images and/or to generate the image data.

According to an embodiment, the dengue virus-containing sample comprises at least two different dengue virus serotypes selected from dengue serotype 1, 2, 3 and 4, preferably at least three different serotypes, most preferred the sample comprises four different serotypes.

According to an embodiment, the method is carried out in 6 well or 12 well or 24 well plates, preferably 6 well plates are used.

According to an embodiment, the first incubation period in step (c) is 4 to 8 hours.

According to an embodiment, in step (d) the second incubation period is from 20 to 130 hours.

According to an embodiment, the dengue-susceptible cell line is selected from Vero cells, LLC-MK2 cells and BHK-21 cells, preferably the dengue-susceptible cell line is a Vero cell line derived from ATCC CCL-81.

According to an embodiment, the culture period in step (a) is such that the cell monolayers are at least 90%, preferably at least 95% confluent.

When performing an Immunofocus Assay, a part of the cell layer may be detached, for example during staining and/or during a washing step. A measure reflecting coverage of a container or well with a cell layer is the so-called confluence or confluency, which may refer to the percentage of the surface of a container or well that is covered by adherent cells. Therein, the percentage of surface covered by adherent cells and/or the confluence may be determined based on detecting light scattered by the surface, for example using one or more light sources and/or one or more cameras capturing one or more images of the respective container from one or more viewing angles.

According to an embodiment, the method may further comprise determining a confluence based on capturing one or more images of the container and/or based on capturing light scattered at at least a part of a surface of the container. In particular, a plurality of images may be captured, optionally at different viewing angles, and the confluence may be determined based on inter-comparing the plurality of images, for example inter-comparing at least two images captured at different viewing angles.

Optionally, the method may further comprise comparing the determined confluence with one or more threshold values for the confluence. Further optionally, the method may comprise filtering out a container and/or a plate with one or more containers upon determining that the confluence determined for said container and/or plate equals or exceeds the threshold value for the confluence. Therein, filtering out may comprise flagging the container and/or plate as invalid container and/or plate.

According to an embodiment, the dengue serotype 1 is DENV-1 strain 16007, dengue serotype 2 is DENV-2 strain 16681, dengue serotype 3 is DENV-3 strain 16562 and dengue serotype 4 is DENV-4 strain 1036.

According to an embodiment, in step (c) the cells are incubated at a temperature of 34° C. to 38° C.

According to an embodiment, said sample is a vaccine comprising a monovalent dengue virus composition.

According to an embodiment, said sample is a vaccine comprising a multivalent dengue virus composition, preferably a tetravalent dengue virus composition.

According to an embodiment, the dengue virus vaccine comprises a chimeric dengue serotype 2/1 strain, a dengue serotype 2 strain, a chimeric dengue serotype 2/3 strain, and a chimeric dengue serotype 2/4 strain.

According to an embodiment, said sample is a sample from an individual potentially infected with dengue virus.

A further aspect of the present disclosure relates to the use of the method and/or the computing device as described hereinabove and hereinbelow in the quality control of a virus preparation or a vaccine composition.

A further aspect of the present disclosure relates to a computer program, which when executed by one or more processors of a computing device, instructs the computing device to carry out steps of the method as described hereinabove and hereinbelow.

A further aspect of the present disclosure relates to a non-transitory computer-readable medium having stored thereon a computer program, which when executed by one or more processors of a computing device, instructs the computing device to carry out steps of the method as described hereinabove and hereinbelow.

A further aspect of the present disclosure relates to a computing device comprising one or more processors for data processing, wherein the computing device is configured to carry out steps of the method as described hereinabove and hereinbelow.

Any feature, function, step and/or element presented hereinabove and hereinbelow with reference to one aspect of the present disclosure, equally applies to any other aspect of the present disclosure.

According to an embodiment, the computing device further comprises at least one interface configured to operatively and/or communicatively couple the computing device to at least one camera for acquiring and/or capturing one or more images of the container. The data of the one or more images may be used to generate the image data.

According to an embodiment, the computing device further comprises at least one camera configured to acquire the image data and/or one or more images of the container.

These and other aspects of the disclosure will be apparent from and elucidated with reference to the appended figures, which may represent exemplary embodiments.

BRIEF DESCRIPTION OF THE DRAWINGS

The subject-matter of the present disclosure will be explained in more detail in the following with reference to exemplary embodiments which are illustrated in the attached drawings, wherein.

The figures are schematic only and not true to scale. In principle, identical or like parts are provided with identical or like reference symbols in the figures.

DETAILED DESCRIPTION OF EXEMPLARY EMBODIMENTS

Figure 1:
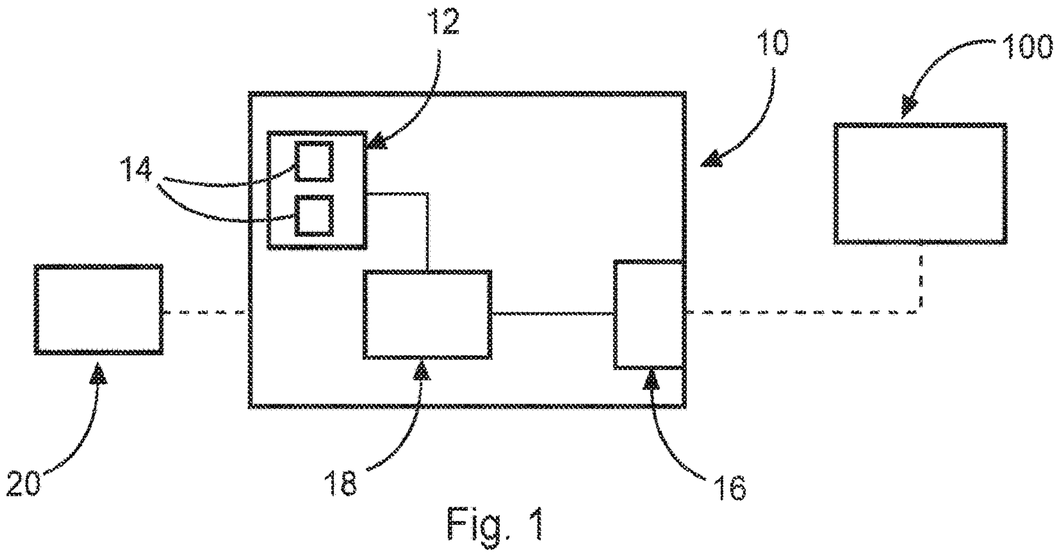
FIG. 1 shows a computing device for determining infectivity of a flavivirus-containing sample according to an exemplary embodiment.

FIG. 1 shows a computing device 10 for determining infectivity of a flavivirus-containing sample according to an exemplary embodiment.

The computing device 10 includes a processing circuitry 12 with one or more processors 14 for data processing. At least one DL algorithm may be at least partly implemented in hard- and/or software in the processing circuitry 12 for determining the infectivity of a flavivirus-containing sample, as described in more detail hereinabove and hereinbelow. In particular, a first and/or a second DL algorithm may be implemented in the processing circuitry 12 of the computing device 10.

The computing device 10 further includes at least one interface 16 for communicatively and/or operatively coupling at least one camera 100 to the computing device 10. Therein, the camera 100 may be considered as part of the computing device 10 or may be considered as external component. Via the interface 16, the camera 100 may be operationally controlled. For example, acquisition of one or more images may be triggered by the computing device 10. Alternatively or additionally, image data of one or more images may be received from the camera 100 via the interface 16.

The interface 16 may be configured for wired or wireless communication using one or more communication protocols. Optionally, a plurality of cameras 100 may be coupled to the computing device 10.

The computing device 10 further includes a data storage 18 for storing at least the image data of the camera 100. The data storage 18 may also store software instructions for instructing or controlling the computing device 10 and/or the camera 100.

Further, the computing device 10 comprises a human machine interface 20, such as a monitor, allowing to present information to a user or operator and/or allowing to receive control signals therefrom to operationally control the computing device 10 and/or the camera 100.

Figure 2A:
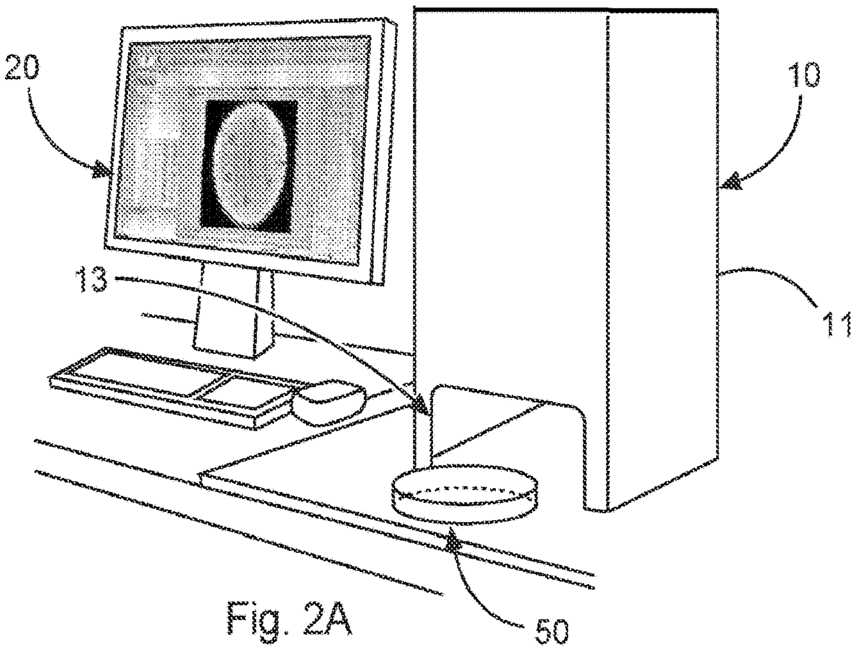
FIG. 2A shows a computing device for determining infectivity of a flavivirus-containing sample according to a further exemplary embodiment.
Figure 2B:
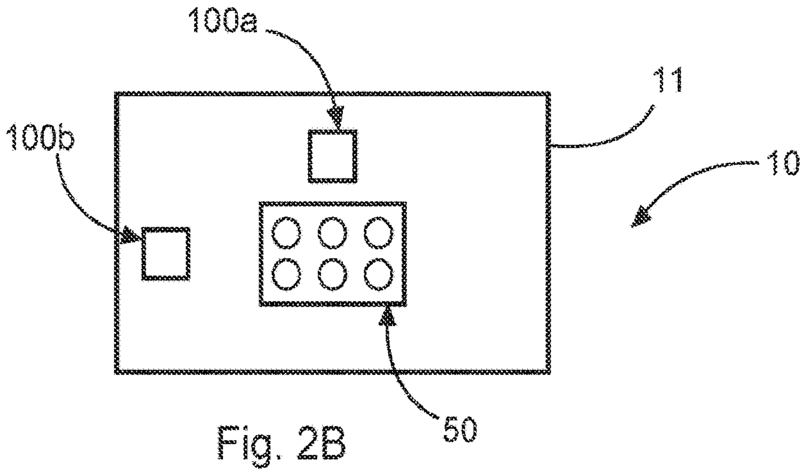
FIG. 2B shows a cross-sectional view of a computing device according to an exemplary embodiment.

FIG. 2A shows a computing device 10 for determining infectivity of a flavivirus-containing sample according to a further exemplary embodiment. FIG. 2B shows a cross-sectional view of a computing device 10 according to an embodiment. Unless stated otherwise, the computing device 10 of FIGS. 2A and 2B comprise the same features, functions and/or elements as the computing device 10 described with reference to FIG. 1.

The exemplary computing device 10 of FIGS. 2A and 2B comprises a housing 11 with a front opening 13 to insert one or more containers 50. In particular, the housing 11 and the front opening 13 may be sized and configured to receive at least a 6-well plate with six containers 50, as shown in FIG. 2B. It is noted that in the example of FIG. 2A a single-well plate with a single container 50, respectively a single container 50, is illustrated, whereas in the example of FIG. 2B a 6-well plate with six containers 50 is illustrated. However, also in the embodiment of FIG. 2A a multi-well container 50 may be used and/or in the embodiment of FIG. 2B a single well container 50 may be used. Also 12- or 24-well plates or other containers can be used in either embodiment shown in FIGS. 2A and 2B.

The housing 11 and front opening 13 may particularly serve to block light from outside during acquisition of the one or more images of the containers 50.

As schematically shown in the cross-sectional view of FIG. 2B, the computing device 10 may comprise two cameras 100*a*, 100*b*. One camera 100*a* may be arranged above the containers 50 and another camera 100*b* may be arranged on a side of the containers 50. Other view angles and camera positions are possible.

As described in more detail hereinabove and hereinbelow, the computing device 10 may include a first DL algorithm and a second DL algorithm, which differ from one another. In particular, the computing device 10 may be configured to evaluate the image data received from the one or more cameras 100*a*, 100*b* with respect to one or both a predefined maximum number of foci allowed in a single container and a predefined minimum number of foci allowed in a single container, based on detecting the one or more foci in a container 50 using the first trained deep learning algorithm of the computing device 10.

Further, the computing device 10 may be configured to count the foci in those containers 50 that have been identified by the first DL algorithm to contain a number of foci between the minimum and maximum number of foci allowed. Containers 50 having a number of foci exceeding the maximum number or being below the minimum number may be flagged as invalid by the first DL algorithm and the corresponding image data may not be processed by the second DL algorithm.

The computing device 10 may further be configured to compute and/or calculate the virus titer, activity, potency and/or infectivity based on the number of foci determined for one or more valid containers 50, i.e. containers 50 having a number of foci between the minimum and maximum number as determined with the first DL algorithm, wherein individual numbers of foci for the valid containers 50 may be determined with the second DL algorithm. The predefined maximum number of foci allowed may range from about 70 to about 200, preferably from about 80 to about 150, and may more preferably be about 100 foci. The predefined minimum number of foci allowed may range from 0 to about 30, preferably from 0 to about 20, and may more preferably be about 10 foci.

Accordingly, the first deep learning algorithm may be trained to identify containers 50 containing a number of foci exceeding the predefined maximum number of foci allowed and/or to identify containers 50 containing a number of foci below the predefined minimum number of foci allowed. Further, the second trained deep learning algorithm may be trained to determine the number of foci in the at least part of the container upon determining with the first DL algorithm that the number of foci in said container 50 ranges between the minimum and maximum number of foci allowed.

Optionally, the computing device 10 may be configured to determine a cell-free portion of the container 50 based on processing the image data, the cell-free portion lacking cells of the cell culture. The computing device 10 may further be configured to mark the container 50 as invalid upon determining that the determined cell-free portion of the container exceeds a predefined threshold for a maximum cell-free portion allowed in a single container. The predefined threshold for the maximum cell-free portion allowed may be about 5% to about 20%, preferably about 8% to about 15%, for example about 10% of a usable area of the container.

The first and/or second DL algorithm may be implemented as convolutional neural network in the computing device 10. The first trained deep learning algorithm may be a region-based algorithm for object detection, such as a Faster R-CNN algorithm. Alternatively or additionally, the second trained deep learning algorithm may be a YOLO algorithm.

Figure 3A:
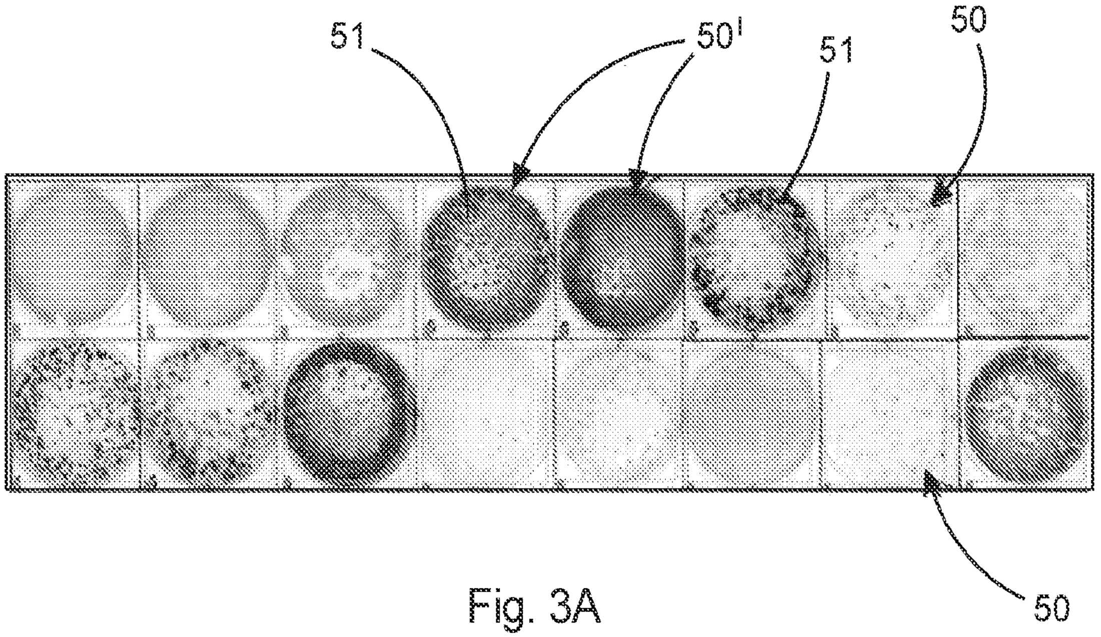
FIGS. 3A and 3B each show training data for training one or more deep learning algorithms of a computing device according to exemplary embodiments.
Figure 3B:
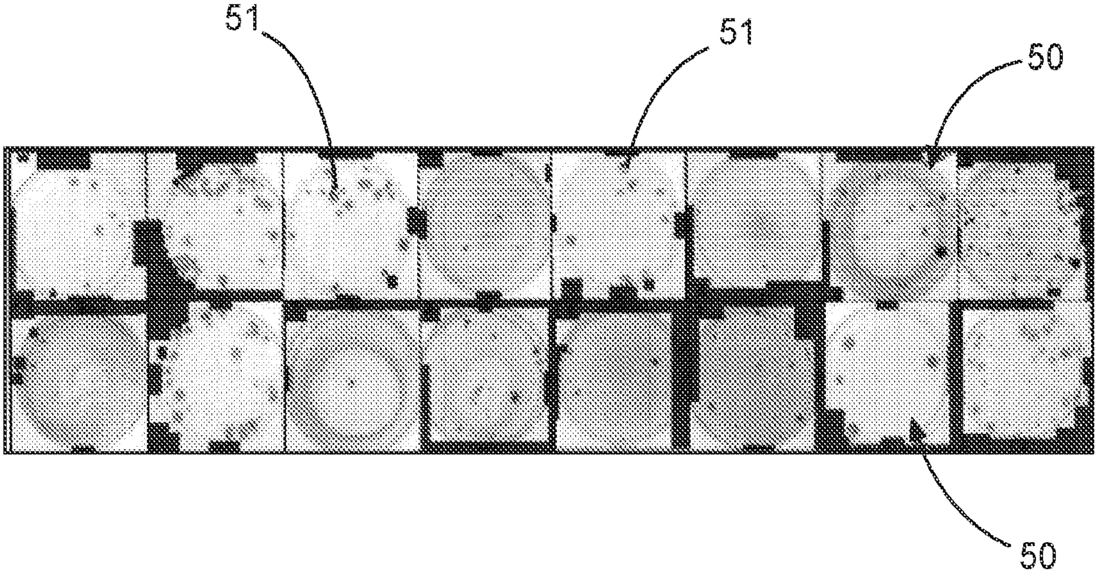

To actually count the number of foci, the first and second DL algorithms have been trained for their dedicated purposes. FIGS. 3A and 3B each show training data for training one or more deep learning algorithms of a computing device 10 according to exemplary embodiments, for example the computing device 10 of one or more of FIGS. 1 to 2B. In particular, FIGS. 3A and 3B illustrate images or image data of a plurality of containers 50 containing a flavivirus sample prepared in an IFA to generate varying numbers of foci 51 in each container 50.

Therein, FIG. 3A shows annotated or labelled training data to train the first DL algorithm, e.g. Faster R-CNN, to detect wells or containers 50 having a number of foci violating one or more predefined acceptance criteria, in particular having a number of foci exceeding the predefined maximum and/or minimum number of foci allowed. Labeling areas are marked with a rectangle in FIG. 3A and an acceptance label may indicate violation of one or more of the acceptance criteria. For instance, containers 50* in FIG. 3A may have a number of foci above the predefined maximum number allowed and may be labelled as invalid containers 50*.

FIG. 3B shows annotated or labelled training data to train the second DL algorithm, e.g. YOLO, to classify the containers 50 according to the actual number of foci contained therein, based on recognizing and counting the number of foci 51 in each container 50. Optionally, certain areas may be excluded from training, which are marked by rectangles in FIG. 3B.

Figure 4:
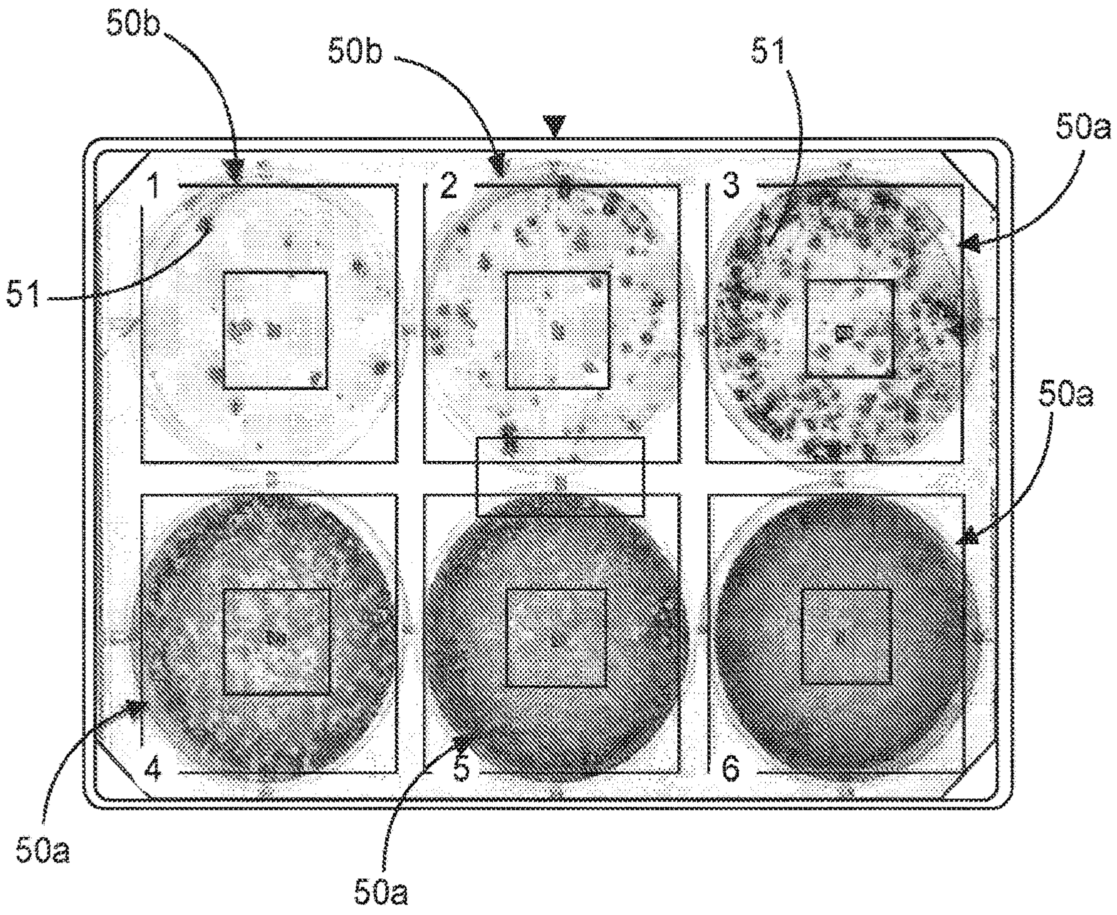
FIG. 4 shows image data evaluated by a first and second trained deep learning algorithm of a computing device according to an exemplary embodiment.

FIG. 4 shows image data evaluated by a first and second trained deep learning algorithm of a computing device 10 according to an exemplary embodiment, for example as described with reference to one or more of FIGS. 1 to 3B.

In the particular example shown in FIG. 4, an image of a 6-well plate with six containers 50*a*, 50*b* is shown. The containers are numbered 1 to 6 in FIG. 4.

The first DL algorithm analysed the image data and containers 3 to 6 with reference numeral 50*a* in FIG. 4 were found to have a number of foci 51 exceeding the predefined maximum number of foci 51 allowed. These containers 5*a* were excluded from further analysis using the second trained DL algorithm.

Accordingly, only containers 1 and 2 with reference numeral 50*b* were found by the first DL algorithm to have a number of foci 51 below the predefined maximum number and/or complying with one or more further acceptance criteria, such as having a number of foci above a predefined minimum number of foci allowed and/or having a certain cell-free portion.

The image data associated with containers 1 and 2 may then be further analysed by the second DL algorithm to recognize and count the foci. Optionally, the determined numbers may be used to compute the viral titer.

Figure 5:
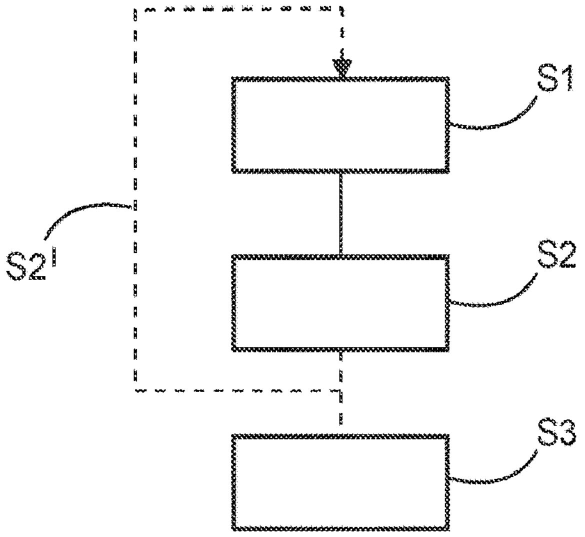
FIG. 5 shows a flowchart illustrating steps of a method of determining infectivity of a flavivirus-containing sample according to an exemplary embodiment.

FIG. 5 shows a flowchart illustrating steps of a method of determining infectivity of a flavivirus-containing sample according to an exemplary embodiment, for example using a computing device 10 as described with reference to one or more of FIGS. 1 to 4.

In a first step S1 image data indicative of an image of at least a part of a container 50 comprising a composition containing host cells with one or more foci 51 generated by infecting the host cells with the flavivirus over an incubation period and optionally subsequent staining of the incubated host cells is received by the computing device 10.

Optionally, one or more images may be acquired with one or more cameras 100 in step S1. Further optionally, image data of the one or more images may be retrieved from a data storage 18 of the computing device 10 in step S1.

In a further step S2 a number of foci in the at least part of the container 50 is determined based on processing the received image data with at least one trained deep learning algorithm of the computing device 10, wherein the number of foci is indicative of the infectivity of the flavivirus in the sample.

Optionally, the image data may be analysed with a first DL algorithm and a second DL algorithm in step S2, as described hereinabove.

Further optionally, the image data may be analysed and/or evaluated with respect to one or more of a predefined maximum number and a predefined minimum number of foci allowed in a single container.

Steps S1 and S2 may optionally be repeated for one or more further containers 50 or corresponding image data, as indicated by reference numeral S2* in FIG. 5.

In an optional step S3, the titer, activity, potency and/or infectivity of the flavivirus containing sample, which may be a vaccine, may be computed based on one or more numbers of foci counted for one or more containers 50 in steps S1 and S2.

Steps S1 and S2 as exemplarily described with reference to FIG. 5 may be combined with any one or more steps, features or aspects described herein.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims.

As used herein, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

Furthermore, the terms first, second, third or (a), (b), (c) and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In the context of the present invention any numerical value indicated is typically associated with an interval of accuracy that the person skilled in the art will understand to still ensure the technical effect of the feature in question. As used herein, the deviation from the indicated numerical value is in the range of ±10%, and preferably of ±5%. The aforementioned deviation from the indicated numerical interval of ±10%, and preferably of ±5% is also indicated by the terms "about" and "approximately" used herein with respect to a numerical value.

The invention claimed is:

1. A computer-implemented method of determining infectivity of a flavivirus-containing sample, the method comprising:

Receiving, with a computing device, image data indicative of an image of at least a part of a container comprising a composition containing host cells with one or more foci generated by infecting the host cells with the flavivirus over an incubation period and optionally subsequent staining of the incubated host cells; and determining a number of foci in the at least part of the container based on processing the received image data with at least one trained deep learning algorithm of the computing device, wherein the number of foci is indicative of the infectivity of the flavivirus in the sample.

2. The method according to claim 1, wherein determining the number of foci comprises evaluating the image data with respect to one or both of a predefined maximum number of foci allowed in a single container and a predefined minimum number of foci allowed in a single container.

3. The method according to claim 2, wherein the image data is evaluated with respect to one or both the predefined maximum number and the predefined minimum number of foci allowed in a single container based on detecting the one or more foci in the at least part of the container using a first trained deep learning algorithm of the computing device; and wherein the number of foci in the at least part of the container is determined based on detecting the one or more foci in the at least part of the container using a second trained deep learning algorithm different than the first trained deep learning algorithm.

4. The method according to claim 3, wherein the first trained deep learning algorithm and the second trained deep learning algorithm differ in one or more of a type of the respective deep learning algorithm, and a training applied to the respective deep learning algorithm.

5. The method according to claim 3, wherein the first trained deep learning algorithm is trained to identify containers containing a number of foci exceeding the predefined maximum number of foci allowed; and/or wherein the first trained deep learning algorithm is trained to identify containers containing a number of foci below the predefined minimum number of foci allowed; and/or wherein the second trained deep learning algorithm is trained to determine the number of foci in the at least part of the container.

6. The method according to claim 3, further comprising:

determining, with the first trained deep learning algorithm, whether the number of foci detected in the at least part of container exceeds the predefined maximum number of foci allowed and/or is below the predefined minimum number of foci allowed in a single container; and marking the container as invalid upon determining that the number of foci detected in the at least part of the container exceeds the predefined maximum number of foci allowed and/or is below the predefined minimum number of foci allowed in a single container.

7. The method according to claim 2,
wherein the predefined maximum number of foci allowed ranges from about 70 to about 200, preferably from about 80 to about 150; and/or
wherein the predefined maximum number of foci allowed is about 100 foci.

8. The method according to claim 3,
wherein at least one of the first trained deep learning algorithm and the second trained deep learning algorithm is implemented as convolutional neural network in the computing device.

9. The method according to claim 3,
wherein the first trained deep learning algorithm is a region-based algorithm for object detection.

10. The method according to claim 3,
wherein the first trained deep learning algorithm is a Faster R-CNN algorithm; and/or
wherein the second trained deep learning algorithm is a YOLO algorithm.

11. The method according to claim 1,
wherein the container comprises a cell monolayer with immunostained viral antigens of the flavivirus sample resulting in optically detectable foci; and/or
wherein determining the number of foci includes optically identifying one or more foci in the image based on processing the image data with the computing device.

12. The method according to claim 1, further comprising:
determining, based on processing the image data with the computing device, a cell-free portion of the container, the cell-free portion lacking cells of the cell culture; and
marking the container as invalid upon determining that determined cell-free portion of the container exceeds a predefined threshold for a maximum cell-free portion allowed in a single container.

13. The method according to claim 12, wherein the predefined threshold for the maximum cell-free portion allowed is about 5% to about 20%.

14. The method according to claim 1, further comprising:
determining a titer of the flavivirus-containing sample based on the determined number of foci in the at least part of the container.

15. The method according to claim 1, wherein the flavivirus-containing sample comprises a plurality of virus serotypes of the flavivirus; or wherein the flavivirus-containing sample comprises a virus selected from the group consisting of dengue virus, yellow fever virus, Zika virus, an encephalitic virus, Japanese encephalitis virus, Murray Valley encephalitis virus, and West Nile virus, preferably, the flavivirus is selected from one or more of dengue virus serotype 1, dengue virus serotype 2, dengue virus serotype 3 and dengue virus serotype 4.

16. The method according to claim 1, wherein the flavivirus-containing sample is a vaccine comprising a monovalent or multivalent attenuated virus composition, or wherein the flavivirus-containing sample is a tetravalent dengue virus composition.

17. The method according to claim 1, further comprising
(a) seeding cells from a dengue-susceptible cell line in an assay plate and culturing the cells for a culture period;
(b) preparing serial dilutions of the dengue virus-containing sample;
(c) adding the serially diluted samples to the cells seeded and cultured in step and incubating the cells over a first incubation period;
(d) providing an overlay medium for the cells incubated in step, and incubating the cells with the overlay medium over a second incubation period;
(e) fixing of the incubated cells;
(f1) immunostaining of the incubated cells using a dengue virus serotype specific antibody as first antibody and a second antibody being specific for the first antibody and conjugated to an enzyme capable of converting a substrate to a visible dye or conjugated to a detectable label; or
(f2) immunostaining of the incubated cells using a dengue virus serotype specific antibody as first antibody conjugated to a detectable label; and
(g) determining the titer of each dengue virus serotype by counting the number of foci in each well of the assay plate.

18. Use of the method according to claim 1 in the quality control of a virus preparation or a vaccine composition.

19. A computing device comprising one or more processors for data processing,
wherein the computing device is configured to carry out steps of the method according to claim 1.

20. The computing device according to claim 19, further comprising:
an interface configured to operatively and/or communicatively couple the computing device to at least one camera for acquiring the image data, and at least one camera configured to acquire the image data.

* * * * *